May 19, 1942.  F. NALLINGER  2,283,223
AIRCRAFT
Filed Dec. 14, 1938
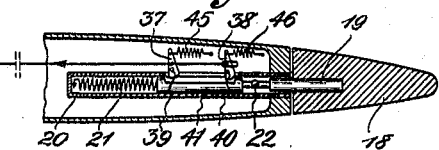
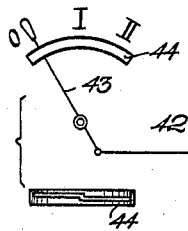
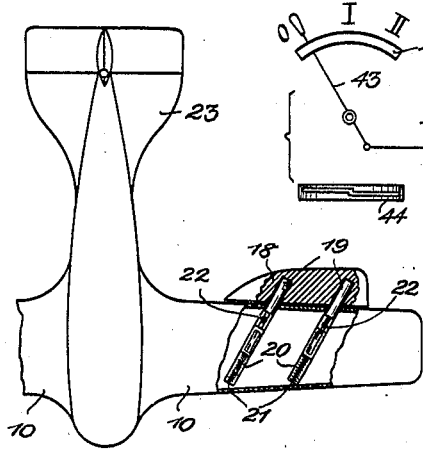
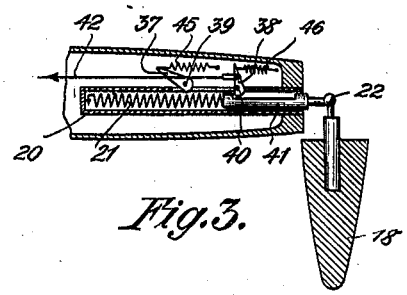
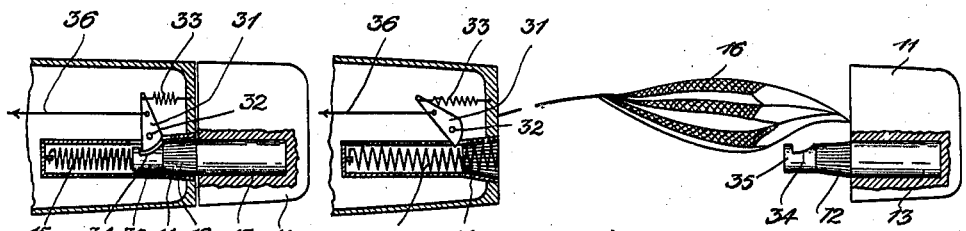
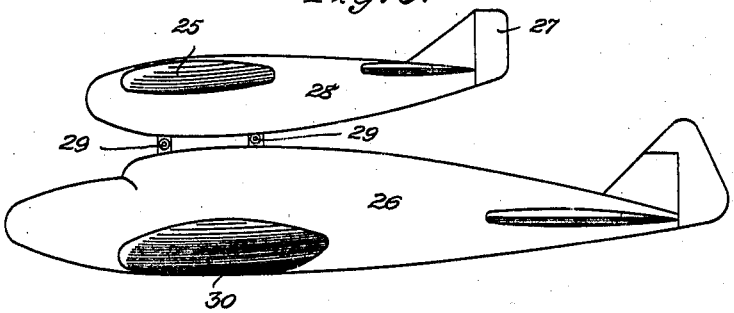
INVENTOR:
FRITZ NALLINGER
by
ATTORNEYS Patented May 19, 1942

2,283,223

UNITED STATES PATENT OFFICE 2,283,223

AIRCRAFT

Fritz Nallinger, Stuttgart, Germany, assignor to Daimler-Benz Aktiengesellschaft, Stuttgart-Unterturkheim, Germany Application December 14, 1938, Serial No. 245,605
In Germany December 14, 1937

11 Claims. (Cl. 244—43)

This invention relates to an improved aircraft, the principal object being to provide releasable additional supporting surfaces which can be released by the pilot so that they become separated from the aircraft after take-off.

To facilitate take-off, it is known to provide air craft with retractable auxiliary supporting surfaces. This provision was particularly intended for long-range high speed craft having an initially high specific surface loading. These auxiliary surfaces were to be moved out to reduce the specific surface loading and therewith the take-off speed, and were to be retracted after take-off so that speed of travel could be increased due to reduction of air resistance. This known arrangement unnecessarily increases the flying weight of the aircraft and involves constructional problems which are difficult of solution. It is true that the retractable surfaces may be used again when landing, so as to reduce the landing speed, but long range aircraft usually land with comparatively empty fuel tanks so that their specific surface loading is considerably lower than it is at the take-off.

The disadvantages aforesaid are avoided by the provisions in accordance with the present invention.

The releasable auxiliary supporting surfaces in accordance with the present invention may be forcibly jettisoned after release, or they may be permitted simply to separate from the aircraft. The said surfaces may be applied either to the front or rear edges of the planes or wings or to the tips thereof. Also, they may be applied as independent additional wings at suitable points and may form with the main supporting surfaces a temporary plane-and-a-half.

If desired, the releasable auxiliary surfaces may be applied so that they can swing into an unloaded position before being jettisoned.

In order to avoid dangerous falling of the released or jettisoned parts, the latter may be provided with parachutes for controlling their descent.

If the auxiliary surfaces of an aeroplane have a central unitary part, they may form the wings of a glider which will glide to earth after release. Such a glider may be manned by a pilot, or it may be capable of flying by itself, either with a separate body and with its own control and stabilizing surfaces, or as an inherently stable supporting wing, for example in the form of the so-called "flying triangle."

In the annexed drawing:

Figure 1 is a sectional plan of an aircraft fitted with releasable auxiliary supporting surfaces at the rear edges of its main planes;

Figure 2 is a cross section to a larger scale of one of the planes fitted with an auxiliary supporting surface seen in Figure 1, and it includes a diagrammatic showing of the releasing means for the auxiliary supporting surface;

Figure 3 is similar to Figure 2, but shows the auxiliary supporting surface in a partially released condition;

Figure 4 is a sectional plan of the tip portion of a plane, having a releasable auxiliary surface attached thereto;

Figure 5 is similar to Figure 4, but shows the auxiliary surface released and jettisoned from the wing tip and with a parachute attached to and outflowing from it; and Figure 6 is a side elevation of a composite craft wherein the upper small unit which comprises the auxiliary supporting surfaces is releasable from the lower unit which is the aircraft proper.

Referring to Figure 1, an aircraft comprising the usual wings 10 and tail unit 23 is fitted at the rear edge of the wings with auxiliary supporting surfaces 18 which are releasable in a manner hereinafter described.

As already indicated, the releasable auxiliary surfaces may be attached to other edges or parts and referring to Figure 4 it will be seen that an auxiliary supporting surface 11 is attached to the tip of a wing such as 10 in Figure 1. The releasable attachment of this auxiliary surface 11 to the main supporting surface is effected in such fashion that a conical extension 12 of the main spar 13 of the auxiliary surface 11 extends into a correspondingly shaped open end of a socket 14 of the main supporting surface and is locked therein in appropriate readily releasable fashion. The locking is designed so that it can be released at any time from the pilot's seat. The locking means consists of a pawl 31 which is mounted rotatably about a pivot 32 and is pressed by a spring 33 into the recess 34 and against a stop surface of the part 35 of the spar 13. The pawl 31 can be swung to release the stop part 35 by a pull-cable 36 which can be pulled from the pilot's seat, and the supporting surface 11 is thereby released and can be forcibly thrown off or jettisoned by a spring 15 housed within the socket 14. In order to prevent unintentional turning of the conical spar-stub 12 in the socket 14, the former may be roughened, toothed or otherwise provided with notches on its outer surface, and the latter on its inner surface. The compression spring 15 in the socket 14 is highly stressed and constantly tends to eject the spar-stub 12 from the socket 14 against the action of the locking device. The position of the main spar 13 of the auxiliary supporting surface 11 is so selected that its longitudinal axis lies somewhat in front of the mean pressure line of said auxiliary surface when at its normal angle of incidence.

When the aircraft, after take-off, has reached a sufficient flying altitude and the additional surface has thus fulfilled its purpose, the pilot first releases the means locking the auxiliary surface 11 slightly, so that the spar-stub 12 can move a little from its conical seating. The spar-stub 12 can now turn freely about its longitudinal axis. Consequently, the auxiliary surface 11 reduces its angle of incidence until its mean pressure line, which accordingly travels forwardly, coincides with the axis of rotation of the spar 13. With this setting, the additional surface now supports substantially its own weight only, and therefore no longer assists the main supporting surface. The pilot of the aircraft can now adjust the trimming of the machine in accordance with the new condition. He then completely releases the locking means as seen in Figure 5, so that the spar-stub 12 is ejected from the socket 14 by the compression spring 15 and the auxiliary supporting surface 11 is consequently projected away from the main supporting surface 10. At the same time, a parachute 16, Figure 5, which has lain packed in the hollow space of the auxiliary surface 11, is projected from the latter or is drawn out with the aid of a rip cord attached to the main supporting surface, whereupon the auxiliary surface suspended from the parachute floats slowly to earth. Naturally, the process described takes place simultaneously on both sides of the aircraft.

Referring to Figures 1 to 3, the attachment of the auxiliary supporting surfaces to the rear edge of the main planes is effected by spars 19 which are inserted against the compression of springs 21 in corresponding sockets 20 in the main supporting surface 10 and are locked therein. The spars 19 are divided by ball joints 22 which, as long as the spars are located completely in the sockets 20, have no particular effect. The unlocking of the auxiliary surfaces 18 from the pilot's seat after take-off has been completed is effected here also in two stages. First of all the additional surfaces are pushed rearwardly by the springs 21 until the ball joints 22 just emerge from the tubular sleeves 20 as seen in Figure 3. The additional surfaces are then swung by the wind of flight, about the horizontal line connecting the ball joints, into an indifferent position in which they now support substantially their own weight only. After re-trimming of the aircraft by the pilot, the means locking the auxiliary surfaces 18 is completely released and the auxiliary surfaces are projected rearwardly by the springs 21. The spars 19 and sockets 20 are set at an angle as seen in Figure 1 so that, due to the obliquely outwardly directed ejection of the spars 19, the projection of the auxiliary surfaces 18 takes place in a direction rearwardly and outwardly. By this means, the auxiliary surfaces 18 cannot come in contact with the rearward control means of the tail unit 23 of the aircraft. If desired, parachutes may be disposed in the auxiliary surfaces as already explained with reference to Figure 5, so that upon the throwing off of the auxiliary surfaces 18, the parachutes open in order to carry the said surfaces back to the ground without danger.

The locking means may comprise two pawls 37, 38 Figures 2 and 3 rotatable about pivots 39 and 40. The pawls engage in a groove 41 in the spar 19 and are under the influence of respective springs 45 and 46. Initially, the pawl 37 under the action of its spring 45 secures the spar against the ejecting action of the spring 21 by engaging with a shoulder at one end of the groove 41, as seen in Figure 2. A pull-cable 42 connects the pawls 37, 38 with an operating lever 43 at the pilot's seat, which is guided in a guideway 44 seen in plan beneath the lever 43 in Figure 2. In the arrangement illustrated, the pull cable 42 is connected fixedly with the pawl 37 but has a bridle engagement with the pawl 38 giving a certain amount of lost motion which permits of the pawls 37 and 38 being operated in succession by the pull cable 42. In the position illustrated in Figure 2, in which the auxiliary supporting surface 18 is fixed, the pawl 37 secures the spar 19 and the operating lever 43 is in the position O to the left in the guideway 44. If the lever 43 is moved into the central position I, then the pawl 37 is raised and releases the spar which is displaced by the spring 21 until the pawl 38 engages the stop shoulder and holds the spar as seen in Figure 3. The joint 22 emerges from the socket 20 and the auxiliary supporting surface 18 is then free to swing into an indifferent position in which it supports substantially its own weight only as already explained. When the lever 43 is moved further into the position II, the pawl 38 is raised in turn to effect complete release and the auxiliary supporting surface 18 is forcibly jettisoned by the springs 21. Upon the first movement of the operating lever 43 from position O into position I, the pawl 38 is not affected since the cable engages this pawl by the lost motion means already referred to. The several cables for the pawls of the spars 19 may be led together to a common cable 42 and operated by a common lever 43. The guide slot in the guideway 44 is bent in the middle as seen in Figure 2, in order to prevent accidental operation of the lever 43 right through the middle position I.

In the example illustrated in Figure 6, single comparatively large auxiliary supporting surfaces 25 are supported centrally above the body 26 of a low-wing machine. The auxiliary surfaces are provided with their own control means 27 and body 28 in which a separate pilot may be accommodated. The additional surfaces are releasably coupled at 29 to the body 26. After the take-off has been completed, this coupling is released from the interior of the aircraft. In this fashion, the specific surface loading of the main supporting surface 30 is increased and that of the additional surface 25 reduced. Consequently, the two uncoupled units tend to move rapidly apart. A pilot seated in the body 28 may then steer the auxiliary supporting surfaces back to the take-off point in gliding flight. Or, the additional surface may be permitted to glide to earth without pilotage.

If desired, more than one auxiliary supporting surface may be releasably attached to each wing, plane or normal supporting surface of an aircraft. For example, the plane 10 in Figure 1 may have both the auxiliary surface of Figure 2 and the auxiliary surface of Figure 4 attached to it in the manner set forth.

It will therefore be seen that I have provided a construction which satisfies the objects enumerated above, and one which constitutes a valuable advance in the art. While 1 have shown the invention in certain embodiments, it is to be understood that modifications of the structure shown may be made by those skilled in this art without departing from my invention as expressed in the claims which follow.

I claim:

1. Aircraft comprising releasable auxiliary supporting surfaces, pivotal attachment means between said auxiliary surfaces and normal supporting surfaces of said aircraft, locking means normally locking said attachment means against any movement but partially releasable to permit pivotal movement and wholly releasable to permit separation of said auxiliary surfaces from said aircraft, and control means operable on said locking means.

2. Aircraft comprising releasable auxiliary supporting surfaces, spars on said auxiliary surfaces and comprising conical stubs, sockets comprising conical seatings for the reception of said stubs said sockets being disposed in the main supporting surfaces of the aircraft, and locking means operative on said stubs and releasable at the will of the pilot.

3. Aircraft comprising releasable auxiliary supporting surfaces, spars projecting from said auxiliary surfaces, sockets within the main supporting surfaces of said air craft and adapted for the reception of the spar projections, pawl devices operable on said spar projections within said sockets in positions of full attachment and partial detachment, and control means on said aircraft operable for successive partial and full release of said pawls from said spar projections.

4. An aeroplane having main supporting surfaces and releasable auxiliary supporting surfaces, attachment means connecting said auxiliary surfaces to the edges of said main supporting surfaces, means for releasing the connection between said main and auxiliary surfaces, and spring ejector means for separating said auxiliary surfaces from said main surfaces after release by outward jettisoning.

5. Aircraft comprising releasable auxiliary supporting surfaces, attachment means connecting said auxiliary surfaces to edges of normal supporting surfaces of said aircraft said attachment means being pivotal in a partially released condition to permit said auxiliary surfaces to swing to an indifferent position, pawl locking means operative for locking said auxiliary surfaces in either a fixedly attached or partially released condition, a hand control movable from a position corresponding with fixed attachment to a position corresponding with full release via a position corresponding with partial release, and stop means adapted for temporarily obstructing said hand control in the intermediate position.

6. In an aircraft having a plurality of main load-supporting surfaces, a plurality of auxiliary load-supporting surfaces, and means for releasably connecting said auxiliary surfaces to said aircraft while permitting said surfaces to swing freely in the slip-stream of said aircraft, while still attached thereto, and means for forcibly jettisoning said surfaces after assumption of their free position.

7. In an aircraft, a main supporting surface having an opening, an auxiliary supporting surface forming an aligned extension for said main supporting surface and provided with a projecting spar extending into said opening, and releasable detent means for first holding said spar in said opening and said auxiliary supporting surface in juxtaposition to said main supporting surface, and then forcibly jettisoning the same.

8. The combination according to claim 7, in which said main supporting surface is the main transverse wing for said aircraft, said auxiliary supporting surface is an extended trailing edge for said wing, and said spar and opening are positioned at such an angle to the central longitudinal plane of said aircraft that upon release said auxiliary supporting surface will move rearwardly and outwardly transversely of said aircraft.

9. The method of releasing an auxiliary supporting surface from an aircraft, which includes the steps of first releasing said surface to permit it to assume a free position in the air-stream while still connected to said aircraft, and then forcibly jettisoning said auxiliary surface.

10. The method of controlling an aircraft provided with aircraft controls and auxiliary supporting surfaces for aid in taking off, which comprises the steps of releasing said auxiliary surfaces to permit them to assume a free position in the air-stream of the aircraft while still connected to said aircraft, after the aircraft has reached a desired height, adjusting the aircraft controls to compensate for such partial release, and then forcibly jettisoning said auxiliary surfaces.

11. In an aircraft having a main load-supporting surface, an auxiliary supporting surface provided with a projecting spar, said spar having a notched portion near its projecting end, socket means on said aircraft for receiving said spar, means tending to forcibly eject said spar from said socket means, a pair of releasable detents for engaging said notched portion, the first of said detents holding said spar in its whole inserted position against the force of said ejecting means, the second of said detents adapted to engage said notched portion for the partial release of said spar upon the release of said first detent, and control means for sequentially releasing said first and second detents.

FRITZ NALLINGER.